(12) United States Patent
Turbin

(10) Patent No.: US 8,726,388 B2
(45) Date of Patent: May 13, 2014

(54) LOOK AHEAD MALWARE SCANNING

(75) Inventor: Pavel Turbin, Jokela (FI)

(73) Assignee: F-Secure Corporation, Helsinki (FI)

( * ) Notice: Subject to any disclaimer, the term of this patent is extended or adjusted under 35 U.S.C. 154(b) by 191 days.

(21) Appl. No.: 13/068,610

(22) Filed: May 16, 2011

(65) Prior Publication Data

US 2012/0297486 A1 Nov. 22, 2012

(51) Int. Cl.
*G06F 11/00* (2006.01)

(52) U.S. Cl.
USPC .......................................................... 726/24

(58) Field of Classification Search
USPC ...................................... 726/22–25
See application file for complete search history.

(56) References Cited

U.S. PATENT DOCUMENTS

| 7,681,237 | B1 | 3/2010 | Spiegel et al. | 726/24 |
| 2006/0101514 | A1* | 5/2006 | Milener et al. | 726/22 |
| 2009/0164813 | A1* | 6/2009 | Tu et al. | 713/320 |
| 2011/0219451 | A1* | 9/2011 | McDougal et al. | 726/23 |

FOREIGN PATENT DOCUMENTS

WO  WO-2008/068240 A1  6/2008

OTHER PUBLICATIONS

Intel® Hyper-Threading Technology, Technical User's Guide, Jan. 2003, 44 pgs.
"Predicting and Measuring Parallel Performance", Intel®, 2 pgs. Mar. 9, 2010, available from http://software.intel.com/en-us/articles/predicting-and-measuring-parallel-performance.

* cited by examiner

*Primary Examiner* — Brandon Hoffman
*Assistant Examiner* — Anthony Brown
(74) *Attorney, Agent, or Firm* — Harrington & Smith

(57) ABSTRACT

According to a first aspect of the present invention there is provided a method of scanning for malware during execution of an application on a computer system. The method includes detecting accesses by the application to files within a common directory, using the detected accesses to identify one or more groups of files within said common directory that the application may subsequently want to access, and scanning said one or more groups of files for malware prior to the application attempting to access files of the group or groups.

22 Claims, 6 Drawing Sheets

| DIRECTORY PATH | ACCESED EXTENSIONS LIST | HIT COUNT | ENTRY STATE |
|---|---|---|---|
| C:\WINDOWS\SYSTEM32 | DLL, EXE | 7 | COLLECTED |
| C:\PROGRAM FILES\MICROSOFT OFFICE\OFFICE | EXE, DLL | 3 | NOTED |
| C:\PROGRAM FILES\ADOBE\READER 8.0\RESOURCE\FONT | PFB | 10 | PROCESSED |

LOOK AHEAD MALWARE SCANNING

TECHNICAL FIELD

The present invention relates to a method and apparatus for performing malware scanning. In particular, the present invention relates to a method and apparatus for optimising the performance of a computer system that performs malware scanning on a group of files.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious or unwanted software.

Many end users make use of anti-virus software to detect and possibly remove malware. In order to detect a malware file, the anti-virus software must have some way of identifying it amongst all the other files present on a device. Typically, this requires that the anti-virus software has a database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

Anti-virus software typically provides on-demand scanning of files in which the user of a computer system determines when the files on the computer system should be scanned for the presence of malware. In on-demand scanning the user can activate the scanning process manually, or can configure the scanning process to start in certain circumstances. For example, the user could configure the anti-virus software to scan particular folders or directories (these terms will be used interchangeably herein) on a weekly basis, and to scan all the files on a computer system once a month. In addition, the anti-virus software can also provide real-time protection against malware by performing on-access scanning.

In on-access scanning a computer system is monitored for the presence of malware by scanning files automatically in the background as and when there is a detected access of files by one or more applications executing on the computer system. The most common file access method is read-only file-open access. This type of access is common for operations on multiple files, for example searching for/in files, start-up and during execution of an application, copying files from folder to folder (directory to directory), compressing files, etc. The following examples further illustrate some of these common operations.

Example 1

The Copy Command

C:\>copy source\*.* d:\dest

This command (application) could be represented by the following pseudo code:

```
for each file in c:\source\*.*
    read-only open current file (c:\source\...)
    read file data
    close file
    save data to d:\dest\
```

The copy command generates continuous and sequential read-only access for all source files.

Example 2

An Application Executing with Many Module Files

It is assumed that the application consists of a single executable (.EXE) and a number of modules such as dynamic linked libraries (.DLL). When a user launches the application, the application loads the necessary libraries and then starts. This operation could be represented by the following pseudo code:

```
for files application.exe, module1.dll, module2.dll... moduleN.dll
    read-only open current file
    load file data
```

The application generates continuous and sequential read-only file-open accesses for the source files in the application and/or relevant module directories.

Similar patterns of continuous and sequential read-only file-open access of multiple files in a given directory may be found in other commands or applications, eg searching a pattern in a collection of files (grep.exe or findstr.exe), calculating a hash over files (md5.exe), packing files into container (rar.exe or winzip.exe) and so on.

FIG. 1 illustrates a conventional interaction between an application and anti-virus software when the application performs a read-only file-open access of multiple files. During this operation only when the anti-virus software detects access by the application to the files does it perform on-access scanning of the files.

In particular, when the application attempts to open a file, the open request is intercepted by a filter that generates a scanning request for use by the anti-virus software and prevents the application opening and using the file. On receiving the scanning request, the anti-virus software scans the file and generates a result in the usual way. Depending on the result, access of the file is handed back to the application for its use, for example, reading, copying, or executing the file. However, if multiple files need to be accessed by the application, this operation will be repeated sequentially for each subsequent file access by the application as shown in FIG. 1. This is a very slow and laborious process, which impacts the performance of the application and the computer system.

Most modern computer systems are now optimized for multitasking. A typical CPU often includes multi-core (multi-threaded) support, which effectively allows application tasks to execute seemingly simultaneously. A thread of execution (a thread) is defined as the smallest unit of processing (eg a task or portion of a task) that can be scheduled by an operating system. Multi-threading relates to an application having multiple threads of execution in which the threads are scheduled to be executed by an operating system at the same time. The INTEL™ article, "*Predicting and Measuring Parallel Performance*", Mar. 9, 2010, available from http://software.intel.com/en-us/articles/predicting-and-measuring-parallel-performance/, describes developing parallelized software by multi-threading applications to allow them to process a given data set in less time, or process multiple data sets in a fixed time.

A single processor can perform multi-threading by time-division multiplexing the threads of execution (ie multi-tasking) so the processor switches context between different threads. This context switching happens so frequently that the user perceives the threads or tasks to be executing simultaneously or in parallel. On a multi-processor or multi-core system, some of the threads or tasks actually execute at the same time, (depending on the number of processors), with each processor or core running a particular thread or task. In order to gain the maximum performance, applications, when executing on the computer system, should try to parallelize their complex equations or tasks.

Parallel scanning several files for malware with anti-virus software can be achieved by simultaneously scheduling one or more threads to handle the scanning process of each of the files. As mentioned above, the operating system manages the execution of the threads on a multi-tasking and/or a multi-core computer system. Parallel scanning can be performed on multiple files in a scan queue to increase performance of the computer system. Queuing the accessed files for malware scanning can use the power of parallel scanning. Such scanning could be performed by asynchronous on-close scanning methods. But, even with multi-core support, on-access parallel scanning of multiple files for malware during read-only file-open access by an application is problematic. Queuing files for later parallel or batch scanning is not an option for applications that require read-only file-open access operation. This type of file access requires an immediate synchronous response from the anti-virus software to allow the application to proceed as quickly as possible. Scanning requests from the filter driver to anti-virus cannot be queued for future group processing because the anti-virus software does not know the next file that an application will require.

Applications can generate arbitrary multiple sequential read-only file-open requests and the typical anti-virus scanning logic requires that every read-only file-open request triggers a scanning event or request for that file. Due to the sequential nature of the file access, the scanning logic cannot determine which files will subsequently be accessed by the application. This does not allow the anti-virus software to take advantage of performing batch or parallel scanning of multiple files on modern computer systems. This means the application will need to either wait until scanning for malware finishes on all files before starting, or be interrupted during execution while each file to be accessed is scanned. Both scenarios significantly degrade the performance of the application and the computer system.

The synchronous process of on-access scanning blocks an application from starting or interrupts execution of the application until a malware scan for all files or for each file, has been completed. As such, the anti-virus software prevents the execution of the application from progressing, slowing the rate at which it can complete its tasks. This impacts the performance of the computer system.

SUMMARY

It is an object of the present invention to provide a method of performing malware scanning that minimises the delays introduced by scanning during the execution of applications on a computer system, therefore optimising the performance of the computer system.

According to a first aspect of the invention there is provided a method of scanning for malware during execution of an application on a computer system, the method comprising detecting accesses by the application to files within a common directory, using the detected accesses to identify one or more groups of files within said common directory that the application may subsequently want to access, and scanning said one or more groups of files for malware prior to the application attempting to access files of the group or groups.

Embodiments of the invention provide that anti-virus software can perform scanning of a group of the plurality of files without the need to fully block the execution of the application prior to using one or more of the files in the group.

As an option, further comprises selecting the group or groups of files based on file types of the files accessed by the application. Selecting the files preferably includes matching the file types of files accessed by the application with the file types of files within the common directory. Preferably, the files within the group or groups of files are files requiring scanning. The method optionally further comprises identifying one or more groups of files by adding the current file detected to be accessed by the application to the group of files for scanning when the current file requires scanning.

The method optionally includes using the detected accesses includes the step of determining the number of detected accesses within the common directory and using the results to trigger the step of scanning the one or more groups. Preferably, triggering the step of scanning occurs when the number of detected accesses reaches a predetermined threshold. Optionally, using the detected accesses to identify one or more groups of files includes the step of adding the current file detected to be accessed by the application to a group of files when the step of scanning is triggered. Optionally, determining the number of detected accesses includes the step of resetting the number of detected accesses when a first period of time has elapsed and the step of scanning has not been triggered. Optionally, the method includes the step of terminating scanning of the group or groups when a second period of time has elapsed after the step of scanning has been triggered.

The method optionally includes the step of using the detected accesses to identify one or more groups of files includes the step of maintaining a list of file types of the detected files accessed and the step of identifying one or more groups of files includes the step of selecting files based on the list of file types. Selecting the files further includes matching the list of file types of the files accessed by the application with the file types of files within the common directory.

As an option, the step of detecting accesses by the application to files within the common directory includes receiving a scan request for scanning a file accessed by the application within the common directory. Optionally, the step of detecting accesses by the application to files within the common directory includes detecting the file access by the application and generating a scan request for scanning the file when scanning is required.

According to a second aspect of the present invention there is provided a computer program for scanning for malware during execution of an application on a computer system, the compute program comprising computer program code means adapted to perform the following steps:
  detecting accesses by the application to files within a common directory;
  using the detected accesses to identify one or more groups of files within said common directory that the application may subsequently want to access; and
  instructing a malware scanner to scan said one or more groups of files for malware prior to the application attempting to access files of the group or groups.

The computer program may further comprise computer program code means adapted to perform scanning of said one or more groups of files for malware.

According to a third aspect of the present invention there is provided a computer program as outlined above embodied on a computer readable medium.

According to a fourth aspect of the invention there is provided a computer system configured to scan files for malware during execution of an application on a processor, the computer system comprising a detection unit for detecting accesses by the application to files within a common directory, and using the detected accesses to identify one or more groups of files within said common directory that the application may subsequently want to access, and instructing a scanning unit for scanning said one or more groups of files for malware prior to the application attempting to access files of the group or groups. The computer system may further include a scanning unit for performing the scanning the one or more groups of files.

DETAILED DESCRIPTION

In order to at least partially overcome the problems described above, it is proposed herein to improve the performance of a computer system by performing batch or parallel on-access malware scanning of multiple files prior to an application using one of the multiple files. This means that the application's execution is not entirely blocked in subsequent file accesses. As described previously, batch or parallel scanning is the simultaneous scheduling of a group of files for scanning by a computer system. For example, simultaneous scheduling of multiple scanning threads, one thread for each file in the group, for execution on the computer system.

This type of scanning is achieved by detecting accesses by the application to files within a common directory, using the detected accesses to identify one or more groups of files within said common directory that the application may subsequently want to access, scanning said one or more groups of files for malware prior to the application attempting to access files of the group or groups. After scanning a group of files, a subsequent group of files may be identified and/or scanned.

By performing batch or parallel scanning of a group of files that the application may use, the chances of the application being blocked or continuously interrupted by a malware scan is minimised. This is because the application may access and use the scanned files in the group, which do not now require scanning. In fact, if the correct group of files is identified for each scan, there will only be a delay of one file scan and thereafter the application's execution should not be blocked by any further malware scans when the application accesses the scanned files. This type of batch or parallel malware scan minimises the delay introduced by on-access malware scanning, thereby optimising the performance of the computer system.

Figure 1:
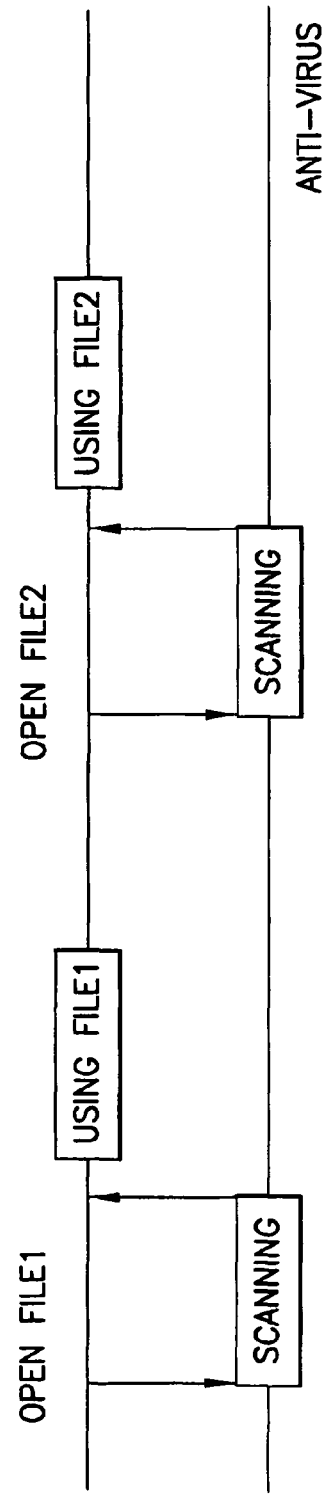
FIG. 1 is a diagram illustrating a prior art process of performing on-access malware scanning.
Figure 2:
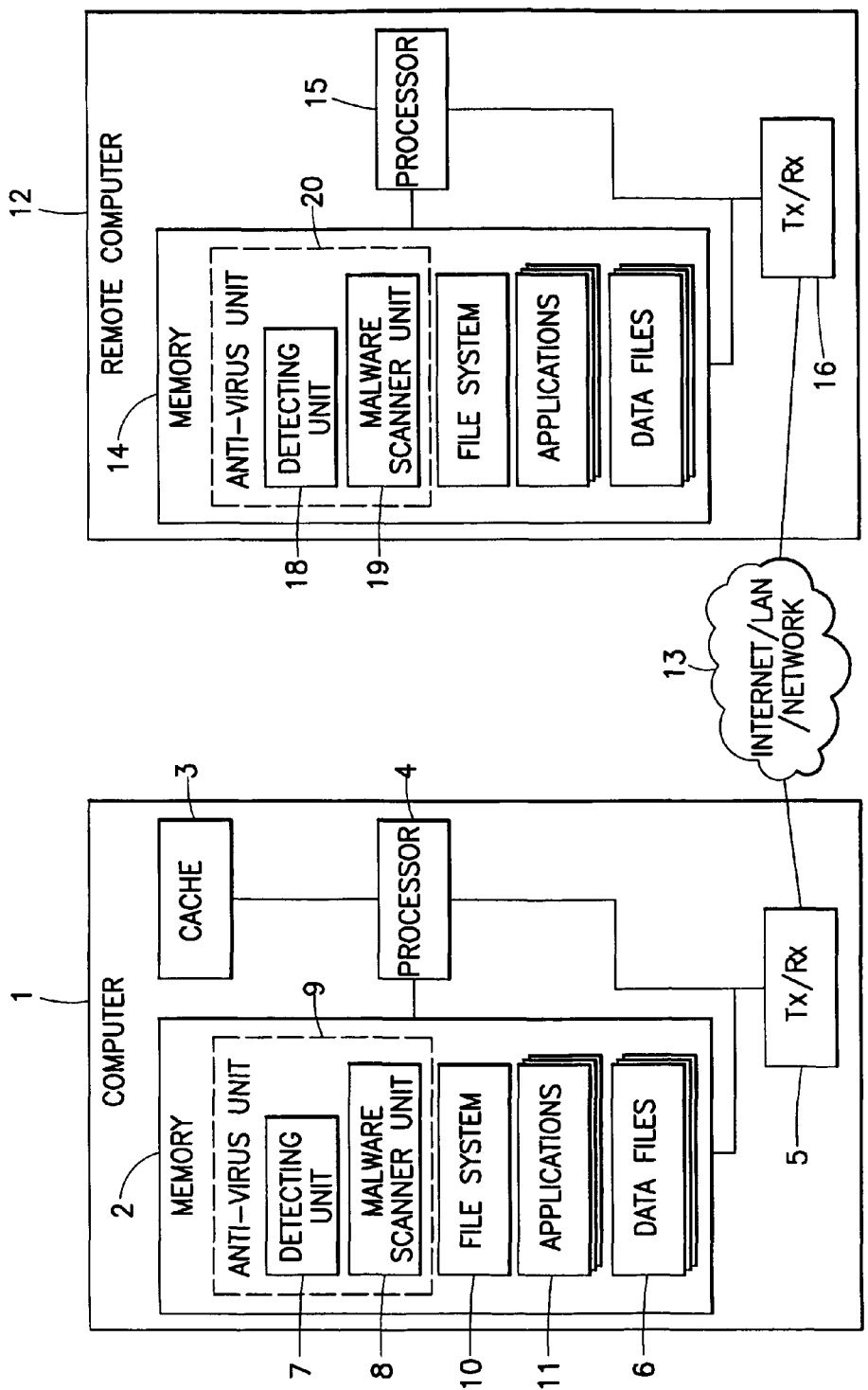
FIG. 2 illustrates schematically a computer system according to embodiments of the present invention.

FIG. 2 illustrates schematically a computer system 1 and a remote computer system 12 according to embodiments of the present invention. The computer system 1 can be implemented as a combination of computer hardware and software. The computer system 1 comprises a memory 2, a cache 3, a processor 4 and a transceiver 5. The memory 2 stores all of the files required by the computer system 1. The files stored in the memory 2 include the various programs/executable files that are implemented by the processor 4, as well as any data files 6. The applications/programs/executable files stored in the memory 2, and implemented by the processor 4, include an detecting unit 7 and a malware scanner unit 8, each of which can be sub-units of an anti-virus unit 9 that may execute anti-virus software locally, as well as the file system 10 and any other programs/applications 11. The data files 6 stored in the memory 2 can include application data files, directory access tables as defined herein, malware definition data files, files containing heuristic analysis rules, white lists, black lists etc. The cache 3 provides a temporary storage unit for storing data that is to be scanned by the malware scanner unit 8. The transceiver 5 can be used to communicate over an Internet/LAN or Network 13 with a remote computer system 12. Remote computer system 12 can provides data storage and application services to computer system 1, for example remote computer system 12 can be an application server providing Software as a Service (SaaS) applications to the user of computer system 1.

The remote computer system 12 is typically operated by a provider of various applications that are executed on the remote system 12 and used remotely by the user of the computer system 1. The remote computer system 12 can be implemented as a combination of computer hardware and software as for the computer system 1. The remote computer system 12 comprises a memory 14, a processor 15, and a transceiver 16. As for the computer system 1, the memory 14 may store files that include various applications/programs/executable files that are implemented by the processor 15, as well as any data files 16. The applications/programs/executable files stored in the memory 14, and implemented by the processor 15 also include a detecting unit 18 and a malware scanner unit 19, each of which can be sub-units of an anti-virus unit 20 that executes anti-virus software locally on the remote system 12. The transceiver 16 is used to communicate with the computer system 1 over the network 13.

In operation the user of computer system 1 may execute applications locally, or may execute applications on remote computer system 12. The malware scanner unit 8 of computer system 1 can be used to scan local files for malware in memory 2 accessed by local applications. The malware scanner unit 19 of remote system 12 can be used to scan files for malware in memory 14 accessed by applications of remote system 12. The methods of scanning the files in any of these systems can be based on those according to the present invention. It is to be appreciated that the embodiments of the invention as described herein can be implemented in stand-alone or networked computing systems through to distributed computing systems where files and applications are stored and executed remotely.

In particular, the computer systems 1 or 12 are configured to scan files for malware during execution of an application or applications running on either of processors 4 or 15, respectively. The computer systems 1 or 12 include detection units 7 or 18, respectively, for detecting accesses by the application to files within a common directory, and using the detected accesses to identify one or more groups of files within said common directory that the application may subsequently want to access, and instructing scanning units 8 or 19, respectively, for scanning said one or more groups of files for malware prior to the application attempting to access files of the group or groups. As illustrated the computer systems 1 or 12 already include scanning units 8 or 19 for scanning said one or more groups of files in response to the instructing of the detection units 7 or 18, respectively. It is to be appreciated that although the scanning units 8 or 19 are implemented within anti-virus units 9 and 20, respectively, the scanning units 8 or 9 could also be implemented on other computer systems/servers such that detection unit 7 or 18 sends instructions over network 13 to have the one or more groups of files scanned.

It is to be appreciated that embodiments of the invention can be used in a Cloud computing or distributed computing system. For example, an application may execute on remote computer system 12 and access files from a remote data center (not shown) where the detection of file accesses is performed at the data center but malware scanning is performed at the remote computer system 12. The remote computer system 12 may perform "Cloud" scanning, which is an example of providing the ability to scan for malware over a network or distributed computer system. To minimise the overhead involved in scanning files over a network, ie minimising bandwidth, scanning can be limited to verification of file meta-data stored in the remote data center (remote server or backend). The meta-data could be created for each file from a hash (eg sha1) calculated from the file's data or specific portions of the file's data. Only the meta-data is uploaded and scanned by the remote computer system 12 when it detects accesses generated by a user's application to the files. The user's host computer system 1 could query the remote computer system 12 in relation to the data of the scanned file and receive the status based on the limited verification scan (clean, infected and malware name).

Embodiments of the invention enable parallel scanning (e.g. multi-threaded scanning) on a computing system 1 or remote computing system 14 for scanning requests such as read-only file-open on-access scanning requests. The methods described herein are based on analyzing the behavior of one or more applications to find dependencies when an application generates sequential access for multiple files in an application's current working directory or a common directory. The term common directory refers to the same logical location in memory (e.g. disk drive) where one or more files are stored. Performance is optimized due to the fact that applications are commonly accessing many files in the same folder or directory. If the anti-virus software recognizes this type of application behavior pattern then it can perform ahead scanning on a group of files the application may subsequently want to access or use. The antivirus software then performs on-access scanning on groups of multiple files for malware.

Figure 3:
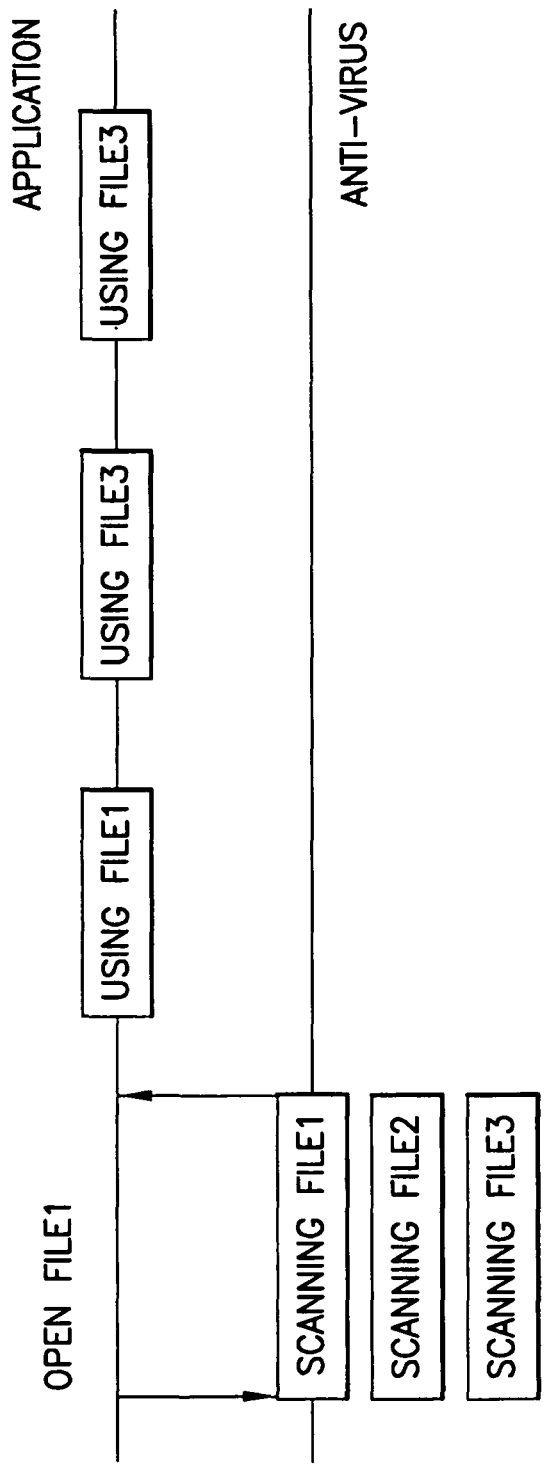
FIG. 3 is a diagram illustrating a process of performing on-access malware scanning according to an embodiment of the present invention.

FIG. 3 illustrates the process of performing batch or parallel on-access malware scanning according to an embodiment of the present invention. The anti-virus software groups multiple files together depending on the behavior of applications accessing the files and executes look-ahead scanning on the groups of multiple files. The results of the scans are cached and if the application accesses the look-ahead scanned file it receives a response from the cache that the file has been scanned and can proceed to use the file.

In practice, normal file scanning is implemented in user-mode and the anti-virus software intercepts low-level file accesses by the application and sends a scan request to the user-mode. This is an expensive operation and requires context switching (kernel to user-mode and back again). It is to be appreciated that the scanning methods as described herein reduce the callbacks from application to the anti-virus software, which considerably improves performance. For example, the anti-virus software has kernel filter driver that intercepts applications attempting to access or open files. The kernel filter driver sends a request to user-mode to perform a scanning task on the file an application attempts to access. The scanning service running in user-mode performs actual malware scanning on the file and notifies the results and status of the scan back to the kernel filter driver. Based on these results the kernel filter driver allows or denies file access to the application.

Referring to FIG. 3, when the application opens the file called file1, the anti-virus software intercepts the application's request to open file1. The anti-virus software, having determined a batch or parallel scan is necessary from the behavior of the application, performs a batch or parallel scan on a group of files, which may include the file requested (eg file1, file2, and file3). Once file1, file2, and file3 have been scanned the results are cached and the application may proceed to open and use file1 as normal. As file2 and file3 have also been scanned, when the application opens these files it receives a response from the cache allowing the application to immediately open and use files2 and file3 (depending on the response). In this example, batch or parallel scanning of the group of files allows the application to execute without further interruption.

Although batch or parallel scanning of a group of files can substantially improve the overall performance of an application or applications executing on a computing system, performance is substantially improved if the group of files scanned includes only those files that are required by the application(s). Scanning of files that are not used by an application may impact performance unless that file will be used by another application. For example, if the anti-virus software scans ahead too many files, which will not be accessed by any application, then it only reduces overall performance as the computers resources are being used for scanning unnecessary files. The following embodiments of the present invention describe methods for minimizing unnecessary file scans, which maximizes the performance of the application or applications and computing system.

Figures 4, 5:
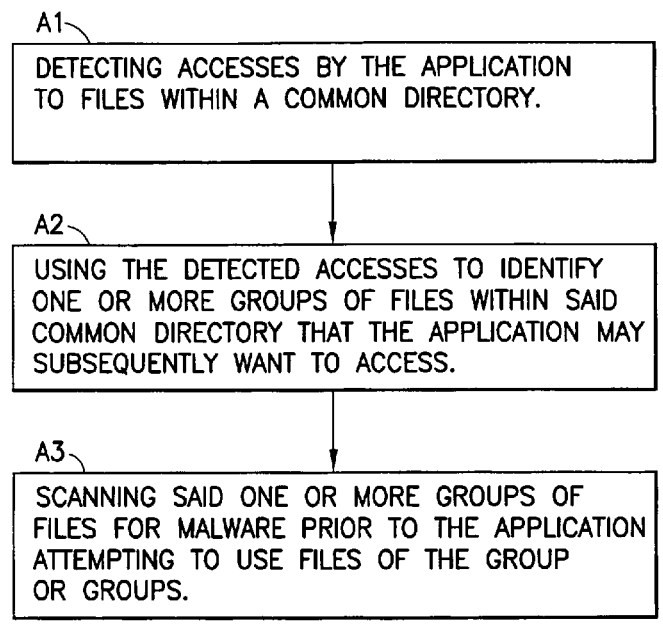
FIG. 4 is a flow diagram illustrating a process according to an embodiment of the present invention.
FIG. 5 illustrates a directory access table for use in updating and maintaining directories accessed by applications according to embodiments of the present invention.

FIG. 4 is a flow diagram further illustrating the process of scanning for malware during execution of one or more applications on a computer system according to an embodiment of the present invention. The processes performed by a scanning unit or anti-virus software for each application accessing files within a common directory is outlined as follows:

A1. Detecting accesses by the application to files within a common directory.

A2. Using the detected accesses to identify one or more groups of files within said common directory that the application may subsequently want to access.

A3. Scanning said one or more groups of files for malware prior to the application attempting to access files of the group or groups.

Regarding step A1, detecting accesses by the application to files within the common directory may include receiving a scan request for scanning a file accessed by the application (the current file accessed) within the common directory.

Detecting the file access by the application may also include intercepting the file access made by the application and generating the scan request and sending the scan request, when scanning is required, to the anti-virus software for scanning.

Regarding step A2, using the detected accesses to identify the one or more groups of files can includes the step of selecting the group or groups of files based on file types of the files accessed by the application. This may involve selecting files that match the file types of files accessed by the application with the file types of files within the common directory. In addition, the files within the group or groups of files may be selected from files within the common directory that require scanning. The current file detected to be accessed by the application can be added to the group of files for scanning if the current file requires scanning.

In order to use the detected accesses and to trigger scanning of the group or groups of files, the step A2 can include determining the number of detected accesses within the common directory and using the results to trigger the step of scanning the one or more groups. Triggering scanning may occur when the number of detected accesses reaches a threshold, N. This threshold could be a predetermined threshold, or a dynamic threshold determined by the anti-virus software and its observed behaviour of the one or more applications accessing files within the common directory. The current file detected to be accessed by the one or more applications can be added to the group of files. This may occur before or when the step of scanning is triggered. The current file accessed may correspond to the file corresponding to the received scan request. The current file is then added to the group of files for scanning. The group of files are scanned based on the scan request received by the anti-virus for the current file. In order to avoid unnecessary scanning when applications access a directory infrequently, the step of detecting the number of accesses can include resetting the number of detected accesses when a first period of time has elapsed and the step of scanning has not been triggered.

As explained below, using the detected accesses to identify one or more groups of files can include the maintaining a list of file types of the detected files accessed and the step of identifying one or more groups of files includes the step of selecting files based on the list of file types. Selecting the files further includes matching the list of file types of the files accessed by the application with the file types of files within the common directory. The anti-virus software can maintain a list for each common directory that has files accessed frequently by one or more applications.

Regarding step A3, using the detected accesses to identify one or more groups of files can include tracking the number of detected accesses and from the results triggering step A3. Triggering step A3 could occur when the number of detected accesses reaches a predetermined threshold or a scan threshold. Identifying one or more groups of files for scanning may include selecting files within the common directory based on file types that were previously or are being accessed by the application. Alternatively, a selection of groups may be determined from a stored list of the types or names of files accessed by various applications, within the common directory. In addition, step A3 may include terminating scanning after a predetermined time period has elapsed, eg if the directory has been frequently accessed but has not been accessed for a period of time that justifies terminating scanning of the directory, then scanning the one or more groups of files could be terminated to avoid unnecessary processing. This may occur when a second period of time has elapsed after the step of scanning has been triggered.

Tracking the number of detected accesses (or hit count) to the common directory helps to determine if applications are actively accessing the directory. If the directory has a high enough "hit count" due to being accessed over a short period of time, then, for subsequent file accesses in the directory, the anti-virus software may simultaneously scan a batch of files selected from prevalent scan file types or from the accessed file type and the current file accessed. As mentioned previously, simultaneous scanning may be achieved by simultaneously scheduling multiple scan threads for scanning the files, that is parallel or batch scanning. Scanning is triggered once the number of detected accesses reaches a threshold.

Scanning is be performed on a group of files if it is detected that the current file an application is accessing is an unscanned file. In this case, the file access is detected or intercepted by a kernel filter driver, which generates a scan request that is received by the anti-virus software for scanning the current accessed file. Instead of only scanning the unscanned file, the anti-virus not only scans the unscanned file that was accessed but also loads a group or groups of files for scanning. The anti-virus software executes scanning of the current scan request (the scan request for the current file accessed) and simultaneously schedules (or executes) scanning of several "piggyback scan requests" of files from a loaded list. The loaded list is a list of files generated by the anti-virus that may be accessed from the directory—it may include prevalent accessed file types. The anti-virus loads a selection of files from the directory based on the loaded list.

For example, if a directory (or folder) has files A, B, C, D, E, then by the time files A and B were scanned it may be considered that this directory has been frequently accessed. If C, D, and E were put on the loaded list, then when scanning is triggered by the frequent accesses, the anti-virus loads files C, D, E (A, B are skipped because they are already scanned). If it is detected that file C is accessed by the application, then a scan request for file C will be received by the anti-virus for scanning, which scans file C together with scanning files D and E. This means when files D and E are subsequently accessed by an application, then scan requests for these files will not be generated by the filter driver as these files have already been scanned.

The group or groups of files are files selected from the directory that the application may subsequently want to access. Scanning of the group or groups "piggybacks" the scanning of the current accessed file, i.e. piggybacks the current file's scan request. This prevents future scan requests being generated or made for the files of the group.

Even if some of the files selected for "piggyback" scanning are not accessed by the application, the performance loss in a single "piggyback" batch is negligible due to batch or parallel scanning. When an application performs long processing (eg copying an entire folder of data) this type of look-ahead scanning considerably increases overall performance. The anti-virus software estimates the plurality of files to be accessed in the directory by selecting the most commonly accessed files that applications have accessed in the directory over a particular period of time. This can be performed by maintaining a run-time table of directory accesses, which depends on the behavior of the various applications being executed.

FIG. 5 is a directory access table illustrating the update and maintenance of detected accesses by applications to files within one or more directories according to embodiments of the present invention. The directory access table can be implemented as a run-time look-up table stored in memory.

The table is maintained by the anti-virus software for use in determining the number of times files in a directory are accessed.

The anti-virus software maintains the run-time directory access table (or directory access table), which tracks the access of files inside directories by applications. In this embodiment, the directory access table has the following fields:

- Directory path, which holds the name or logical location of the directory where one or more files are accessed;
- Accessed extensions list, which contains a list of file extensions of the files that have been accessed and scanned in the directory;
- Hit count, which shows the number of file accesses in the directory; and
- Entry state, which defines the life cycle of the directory's entry In this embodiment, the Entry State field has 3 logical states Noted, Collected, and Processed. The state Noted (ie a pre-scanning state) indicates that the file was accessed in the directory but that the directory's hit count is still not sufficient to warrant parallel or batch scanning. Once the hit count reaches a threshold, the directory's Entry State is changed to the state Collected (ie a scanning state). The state Collected means that the directory has been or is being actively accessed by an application, which warrants parallel or batch scanning. The anti-virus software pre-loads groups of files having file extensions listed in the Accessed Extensions List, or file extensions of the current file that is being accessed for parallel or batch scanning. The state Processed means look-ahead scanning has already been performed for the directory and files should be scanned normally.

Every state has a validity period, after expiry the directory entry is removed from the access table, eg if no files are accessed in a directory for a period of time, then the entry is deemed to be expired. The state Noted has a short period of validity and serves simply to recognize directories that may be accessed frequently. The states Collected and Processed have longer periods of validity to due to frequency of accesses and to avoid unnecessary re-scanning of accessed files in the directory. It is to be appreciated that these periods can be varied by the anti-virus software based on any time scale.

It is to be appreciated that the Entry State field is used to exclude reloading and scanning a directory if it has only recently been processed, (e.g. 10 minutes ago). Other implementations of the directory access table may exclude this field and rely on timers or other means to prevent a directory from being scanned too regularly after it has been processed.

Figure 6:
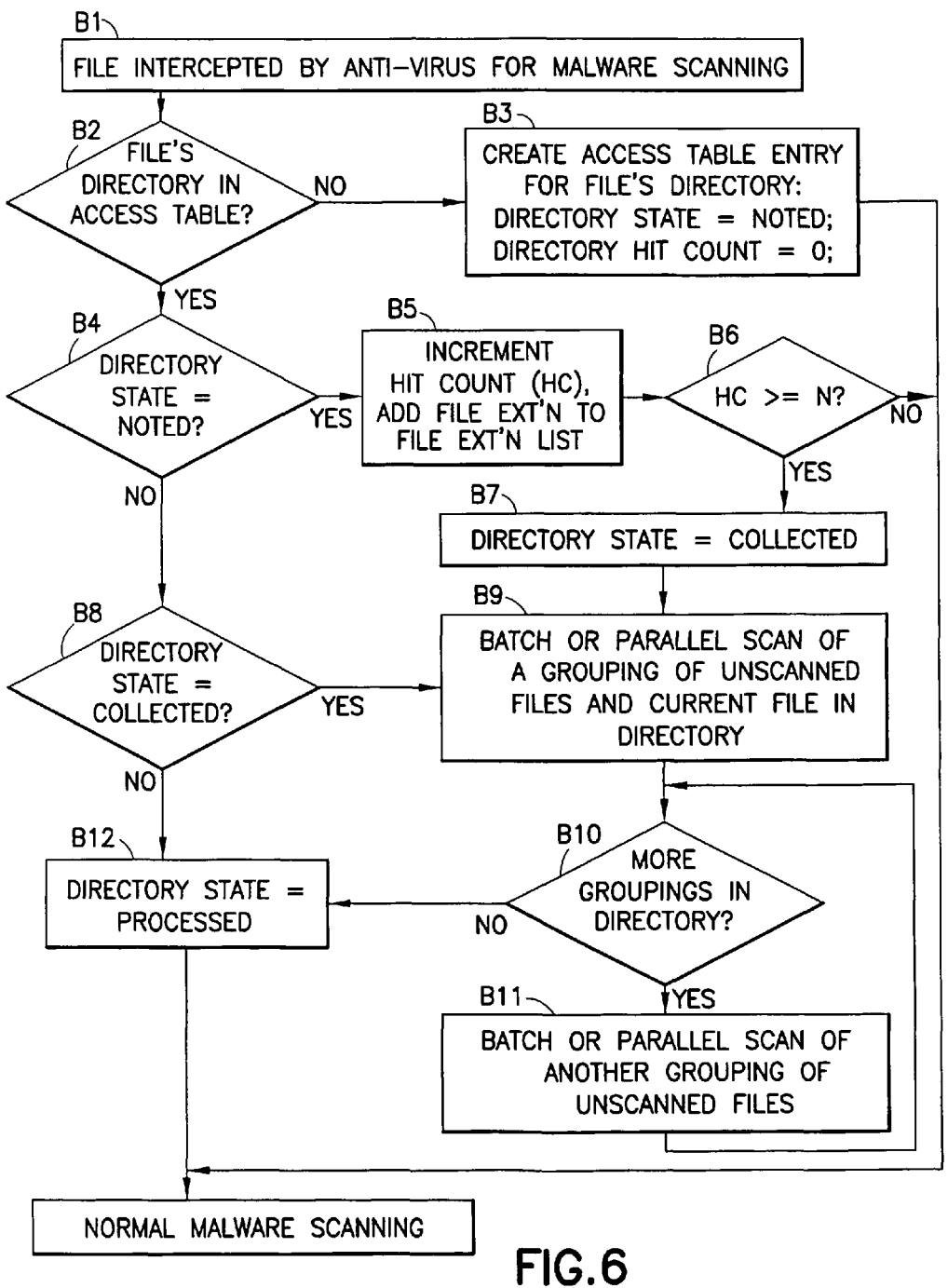
FIG. 6 is a flow diagram illustrating a process of performing on-access malware scanning for an application accessing files according to an embodiment of the present invention.

FIG. 6 is a flow diagram further illustrating the process of using the table of FIG. 5 in performing parallel or batch on-access malware scanning according to an embodiment of the present invention. The method steps are performed by the anti-virus software as follows:

B1. For every file intercepted for malware scanning, eg a scan request is generated for a file open, proceed to step B2 to check access table.

B2. Check whether the file's directory is in the access table, if the directory is not in the access table, then proceed to step B3 to create a directory entry, otherwise proceed to step B4.

B3. Create an access table entry for the file's directory, and initialize the directory's Entry State to Noted, the Hit Count=0, the file's file extension is added to the File Extension List (or scanned file types list), proceed to perform normal malware scanning of the accessed file.

B4. Check whether the directory's Entry State is in state Noted, if the Entry State is Noted then proceed to step B5, otherwise proceed to step B8.

B5. Increment the Hit Count representing the number of file accesses in the directory by various applications and add the file's file extension to the Accessed Extensions List.

B6. Check if Hit Count (HC) reaches a threshold value N (e.g. HC>=N, where N=5). If the Hit Count reaches the threshold value, then proceed to step B7, otherwise normal malware scanning is performed on the accessed file.

B7. The directory's Entry State is changed to the state Collected and the process proceeds to step B8, where the anti-virus software loads a group of files including the accessed file for parallel or batch scanning from the directory.

B8. Check whether the directory's Entry State is in the state Collected, if the Entry State is Collected then proceed to step B9, otherwise proceed to step B10.

B9. Perform a parallel (or a batch) malware scan on a group or a selection of unscanned files including the current file in the directory.

The following rules can be used for selecting a group of files for the batch or parallel scanning:
Select files with extensions or file types matching the currently accessed file; or
Select files with extensions or file types listed in the Accessed Extensions List.

B10. Check whether more groups of files exist in the directory. The files may be selected from the loaded list. If more groups of files exist the method proceeds to step B11, otherwise the method proceeds to step B12.

B11. Another group of unscanned files is selected from the loaded list, and a batch or parallel malware scan is performed, the method proceeds to step B10. Although the anti-virus software is meant to avoid blocking an application's execution, this can be achieved if the multi-core support is able to multi-task between the application and the antivirus software. That is the batch or parallel scanning of further unscanned files in the list could be performed in the background so that the application can proceed.

B12. As no more loaded files or unscanned files having file extensions listed in the Access Extensions List exist in the directory, then the directory's Entry State is changed to the state Processed. If a directory is found in the state Processed the process performs a normal malware scan of the file if necessary.

The results of the malware scans are added into the scan cache and are reported to the application when it accesses a scanned file in the directory, enabling the application to immediately use the accessed file.

Figure 7:
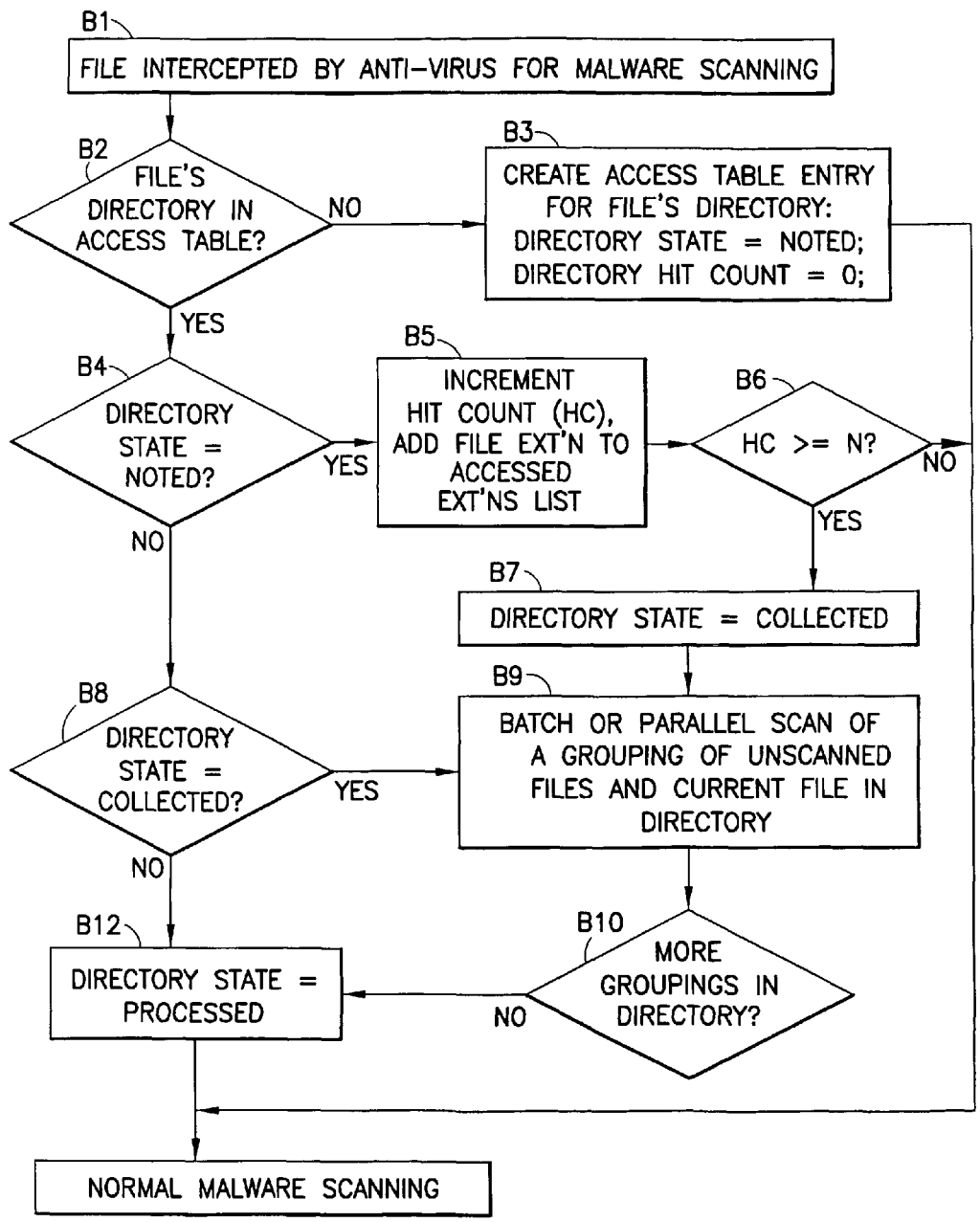
FIG. 7 is a flow diagram illustrating a process of performing on-access malware scanning for an application accessing files according to another embodiment of the present invention.

FIG. 7 is an alternative flow diagram illustrating the batch or parallel on-access malware scanning according to an embodiment of the present invention. The method steps B1 to B12 that are performed by the anti-virus software are similar those of FIG. 6, apart from steps B10 and B11 (B11 has been removed). Step B10 is described as follows:

B10. Check whether more groups of files exist in the directory. The files may be selected from the loaded list. If more groups of files exist, the method proceeds to normal malware scanning until a further file is accessed by the application that requires scanning, where the method begins again at step B1.

The reason for not proceeding to perform further parallel scanning of other groups of files is that the application only needs to access a limited number of files in the directory, this process prevents the anti-virus software from performing a background batch or parallel scan on all files listed in the Access Extensions List until absolutely necessary when another file is accessed by an application. This also minimizes the number of malware scan interruptions during the execution of an application.

The following example illustrates how the above-mentioned method may operate when copying a plurality of files from a common directory. The following assumptions are made:

a) the common directory has a collection of *.exe and *.dll files;
b) the access table is maintained by the antivirus program;
c) the access table already has a directory entry related to the common directory;
d) a hit count representing the number of accesses and a list of file extensions accessed in the common directory is maintained.

The logic flow is as follows:

1. First few accessed "exe" files are scanned normally until the directory collects a sufficient number if hits, i.e. the hit count reaches a threshold;
2. As soon as the hit count reaches a threshold, the anti-virus software loads files from the directory
3. Every next scan request of "exe" file in directory triggers a "piggyback" scan of other "exe" files (a group of files) from the directory;
4. After copy is finished the directory entry expires after a period of time.

In more detail, when the copy operation, copy <from common directory>*.exe <to other directory> is performed, the copy command (application) will access the "exe" files sequentially to read and copy the data into the other directory. When the first "exe" file is accessed from the common directory, a scan request will be generated for the anti-virus software. If the common directory does not have a directory entry in the access table, the anti-virus software will create and initialize a directory entry for the common directory, the directory entry's hit count representing the number of file accesses is initialized and the file type, in this case "exe", is added to an extension list related to the directory entry. Otherwise, the directory entry's hit count is incremented and the "exe" file type is added to the extension list if it is not already on the extension list.

The first "exe" file accessed is then scanned normally for malware and used by the copy command. Subsequent "exe" files are accessed, scan requests are made and scanned normally by the anti-virus software and the hit count for the common directory's entry is incremented on each access until the directory entry related to the common directory collects a sufficient number of hits. As soon as the hit count reaches a threshold, the anti-virus software begins to load or determine one or more groups of unscanned "exe" files from the common directory. Every next scan request of an unscanned "exe" file triggers the antivirus to perform parallel scanning (i.e. substantially simultaneous scanning) of the unscanned "exe" file and one of the groups of unscanned files from the common directory. The scanning continues until the relevant "exe" files in the common directory have been processed or the copy command finishes. After the copy command finishes, the directory entry in the access table will expire within a predetermined time frame and is removed from the access table on expiry.

The computing systems as described herein each may perform batch or parallel scanning of a group of files selected form a plurality of files accessed from a common directory for malware. The processors of such systems are configured to execute computer program instructions based on the methods described herein, such instructions being contained in a computer-readable medium, such as memory. The computer program instructions may be read into memory from another computer-readable medium or from another device via a communication interface. The instructions contained in memory cause the processor of a computer system to perform procedures or methods as described herein. However, alternatively, hardwired circuitry may be used in place of or in combination with computer program instructions to implement processes consistent with the present invention. Thus, the present invention is not limited to any specific combination of hardware circuitry and/or software.

In particular, a computer program including computer program code means adapted to perform the steps of detecting accesses by the application to files within a common directory, using the detected accesses to identify one or more groups of files within said common directory that the application may subsequently want to access, and instructing scanning of said one or more groups of files for malware prior to the application attempting to access files of the group or groups. The computer program may further include computer program code means further adapted to perform scanning of said one or more groups of files. The computer program can be embodied on a computer readable medium.

In addition, the methods described above can exploit the multi-processor, multi-tasking, multi-threading and hyper-threading capabilities of modern computer systems (as described herein and also in Intel® Hyper-Threading Technology, Technical User's Guide, January 2003) to further improve the performance of a computer system when implementing read-only file-open on-access malware scanning, by allowing the scanning of one or more groups of files to be parallelized.

It will be appreciated by the person of skill in the art that various modifications may be made to the above described embodiments without departing from the scope of the present invention.

The invention claimed is:

1. A method of scanning for malware during execution of one or more applications on a computer system, the computer system comprising:

a memory storing computer readable instructions; and
a processor configured to read and execute computer readable instructions stored in said memory, wherein said computer readable instructions comprise instructions causing said processor to perform the method comprising:
maintaining a directory access table for tracking one or more common directories being accessed by one or more applications, wherein the directory access table includes a directory entry for each common directory being accessed, the directory entry for each common directory comprising a hit count indicating the number of file accesses to the common directory, an entry state indicating whether the associated common directory is in one of a pre-scanning state, a scanning state and a processed state; and an accessed file list indicating the files that have been accessed by one or more of the applications;
detecting accesses by the one or more applications to files within a common directory having a directory entry in the directory access table;
when the entry state of the common directory is in the pre-scanning state, then performing the step of adding the accessed file(s) to the accessed file list of the directory entry of the common directory based on the detected accesses;
updating the hit count and entry state of the directory entry of the common directory being accessed based on the detected accesses, wherein the entry state of the common directory being accessed is changed from a pre-scanning state to a scanning state when the hit count reaches a threshold value;

when the entry state of the common directory is in the scanning state, then the method further comprises the steps of:

using the detected accesses to the common directory to identify one or more groups of files within the common directory that the one or more applications may subsequently want to access based on the accessed file list, wherein each group of files includes a plurality of files; and triggering parallel or batch scanning of the files in the one or more groups of files for malware prior to the application attempting to access the files in the group or groups; and updating the entry state of the common directory being accessed from a scanning state to a processed state when all of the identified one or more groups of files in the common directory being accessed have been scanned for malware;

wherein, when the entry state of the common directory is in the pre-scanning state or the processed state, then performing normal malware scanning of the accessed file (s).

2. A method according to claim 1, wherein the step of using the detected accesses to identify the one or more groups of files includes the step of selecting the group or groups of files based on file types of the files accessed by the application.

3. A method according to claim 2, wherein the step of selecting the files further includes matching the file types of files accessed by the application with the file types of files within the common directory.

4. A method according to claim 3, wherein the files within the group or groups of files are files requiring scanning.

5. A method according to claim 2, wherein the step of identifying one or more groups of files includes the step of adding the current file detected to be accessed by the application to the group of files for scanning when the current file requires scanning.

6. A method according to claim 1, wherein using the detected accesses to identify one or more groups of files includes the step of adding the current file detected to be accessed by the application to a group of files when the step of scanning is triggered.

7. A method according to claim 1, wherein determining the number of detected accesses includes the step of resetting the number of detected accesses when a first period of time has elapsed and the step of scanning has not been triggered.

8. A method according to claim 1, wherein the step of scanning the one or more groups of files includes the step of terminating scanning of the group or groups when a second period of time has elapsed after the step of scanning has been triggered.

9. A method according to claim 1, wherein the step of adding the accessed file(s) to the accessed file list includes adding the file type(s) of the accessed file(s) to the accessed file list and the step of identifying one or more groups of files includes the step of selecting files based on the list of file types.

10. A method according to claim 9, wherein the step of selecting the files further includes matching the file types in the accessed files list of the files accessed by the application with the file types of files within the common directory.

11. A method according to claim 9, wherein the files within the group or groups of files are files within the common directory requiring scanning.

12. A method according to claim 9, wherein the step of identifying one or more groups of files includes the step of adding the current file detected to be accessed by the application to a group of files for scanning.

13. A method according to claim 1, wherein the step of detecting accesses by the application to files within the common directory includes receiving a scan request for scanning a file accessed by the application within the common directory.

14. A method according to claim 13, wherein the step of using the detected accesses to identify the one or more groups of files includes the step of selecting the group or groups of files based on file types of the files accessed by the application.

15. A method according to claim 14, wherein the step of selecting the files further includes matching the file types of files accessed by the application with the file types of files within the common directory.

16. A method according to claim 15, wherein the files within the group or groups of files are files requiring scanning.

17. A method according to claim 13, wherein the step of identifying one or more groups of files includes the step of adding the file corresponding to the scan request to the group of files for scanning.

18. A non-transitory computer readable medium comprising a computer program for scanning for malware during execution of one or more applications on a computer system, the computer program comprising computer program code, which when executed on a processor, is adapted to cause the processor to perform the following steps of:

maintaining a directory access table for tracking one or more common directories being accessed by one or more applications, wherein the directory access table includes a directory entry for each common directory being accessed, the directory entry for each common directory comprising a hit count indicating the number of file accesses to the common directory, an entry state indicating whether the associated common directory is in one of a pre-scanning state, a scanning state and a processed state, and an accessed file list indicating the files that have been accessed by one or more of the applications;

detecting accesses by the one or more applications to files within a common directory having a directory entry in the directory access table;

when the entry state of the common directory is in the pre-scanning state, then performing the step of adding the accessed file(s) to the accessed file list of the directory entry of the common directory based on the detected access;

updating the hit count and entry state of the directory entry of the common directory being accessed based on the detected accesses, wherein the entry state of the common director being accessed is changed from a pre-scanning state to a scanning state when the hit count reaches a threshold value;

when the entry state of the common directory is in the scanning state, then the method further comprises the steps of:

using the detected accesses to the common directory to identify one or more groups of files within said common directory that the one or more applications may subsequently want to access based on the accessed file list, wherein each group of files includes a plurality of files; and instructing parallel or batch scanning of said files in the one or more groups of files for malware prior to the application attempting to access the files in the group or groups; and updating the entry state of the common directory being accessed from a scanning state to a processed state when all of the identified one or more groups of files in the common directory being accessed have been scanned for malware;

wherein, when the entry state of the common directory is in the pre-scanning state or the processed state, then performing normal malware scanning of the accessed file(s).

19. The non-transitory computer readable medium of claim 18 further comprising computer program code adapted to perform scanning of said one or more groups of files for malware in response to the step of instructing.

20. A computer system configured to scan files for malware during execution of an application on a processor, the computer system comprising:

a memory storing computer readable instructions comprising a detection unit;

a processor configured to read and execute computer readable instructions stored in said memory;

wherein the computer readable instructions causes the processor to:

maintain a directory access table for tracking one or more common directories being accessed by one or more applications, wherein the directory access table includes a directory entry for each common directory being accessed, the directory entry for each common directory comprising a hit count indicating the number of file accesses to the common directory, an entry state indicating whether the associated common directory is in one of a pre-scanning state, a scanning state and a processed state, and an accessed file list indicating the files that have been accessed by one or more of the applications;

detect accesses by the one or more applications to files within a common directory having a directory entry in the directory access table;

when the entry state of the common directory is in the pre-scanning state, then causing the processor to add the accessed file(s) to the accessed file list of the directory entry of the common directory based on the detected access;

update the hit count and entry state of the directory entry of the common directory being accessed based on the detected accesses, wherein the entry state of the common directory being accessed is changed from a pre-scanning state to a scanning state when the hit count reaches a threshold value;

when the entry state of the common directory is in the scanning state, then the processor is caused to:

use the detected accesses to the common directory to identify one or more groups of files within said common directory that the one or more applications may subsequently want to access based on the accessed file list, wherein each group of files includes a plurality of files, and instruct a scanning unit for parallel or batch scanning of the files in said one or more groups of files for malware prior to the application attempting to access files of the group or groups; and update the entry state of the common directory being accessed from a scanning state to a processed state when all of the identified one or more groups of files in the common directory being accessed have been scanned for malware;

wherein, when the entry state of the common directory is in the pre-scanning state or the processed state, the processor is caused to instruct the scanning unit to perform normal malware scanning of the accessed files.

21. The computer system of claim 20, further comprising a scanning unit for scanning said one or more groups of files in response to the instructing by the detection unit.

22. The method of claim 1, further comprising:

when the entry state of a directory entry in the directory access table is in the pre-scanning state, performing the step of removing the directory entry after a first time period when the hit count for the directory entry is less than the predetermined threshold;

when the entry state of a directory entry in the directory access table is in the scanning state, performing the step of removing the directory entry after a second time period greater than the first time period;

when the entry state of a directory entry in the directory access table is in the processed state, performing the step of removing the directory entry after a third time period greater than the first time period.

* * * * *

UNITED STATES PATENT AND TRADEMARK OFFICE
CERTIFICATE OF CORRECTION

PATENT NO.        : 8,726,388 B2
APPLICATION NO.   : 13/068610
DATED             : May 13, 2014
INVENTOR(S)       : Pavel Turbin It is certified that error appears in the above-identified patent and that said Letters Patent is hereby corrected as shown below:

In the Claims:

In Claim 18:
Column 16, line 59, "director" should be deleted and --directory-- should be inserted.

Signed and Sealed this
Twenty-ninth Day of July, 2014

Michelle K. Lee
*Deputy Director of the United States Patent and Trademark Office*